H. A. P. LISSAGARAY.
Fertilizers.

No. 152,389. Patented June 23, 1874.

H. A. P. LISSAGARAY.
Fertilizers.

No. 152,389.

2 Sheets--Sheet 2.

Patented June 23, 1874.

UNITED STATES PATENT OFFICE.

HENRI A. P. LISSAGARAY, OF PANTIN, NEAR PARIS, FRANCE.

IMPROVEMENT IN FERTILIZERS.

Specification forming part of Letters Patent No. 152,389, dated June 23, 1874; application filed April 1, 1874.

*To all whom it may concern:*

Be it known that I, HENRI ANTOINE PROSPER LISSAGARAY, of Pantin, near Paris, Department de Seine, Republic of France, have invented certain Improvements in the Manufacture of Manures, and in the apparatus employed therein, of which the following is a specification:

My invention consists, first, in an improved process for converting blood from slaughter-houses into a fertilizing agent, whereby such blood is solidified and rendered imputrescible without destroying its assimilating properties, as well as retaining the nitrogenous properties contained in such blood when in its natural state; and, secondly, my invention relates to the construction of an apparatus particularly applicable to the manufacture of such fertilizers, as well as other artificial fertilizers.

In order that my invention may be fully understood, I will proceed to describe, first, the process by means of which the blood is rendered imputrescible when in contact with atmospheric air, and capable of being used as a manure without destroying its nitrogenous properties.

The blood is first mixed with a chemical compound or soluble salt, such as an alkaline sulphite, or an alkaline bisulphite, or a sulphite having an alkaline earth base, or else chlorate of lime or any of the hypochlorites, in such manner that when the blood so mixed and subsequently treated with sulphuric acid, or chloridic acid, or one of the compounds, such as sulphite of aluminum or sulphite of iron, a reaction between the molecules of the whole mass is produced, thereby liberating the constituent element of such chemicals, such as sulphurous acid or chlorine, and producing thereby the following results: First, the complete and thorough coagulation of the blood so treated; secondly, its imputrescibility from contact with atmospheric air or influences without deteriorating the properties contained in the blood so treated, and producing, after desiccation, either in a pulverized state or in forming the same into cakes, a strong powerful manure, easily assimilated, and capable of being shipped to any desired point without inconvenience from nauseous or detrimental exhalations emanating therefrom. And taking into consideration the great amount of nitrogen contained in this product, it can be applied either directly to the soil or mixed with other artificial manures by mixture with the latter, thereby greatly augmenting their fertilizing powers.

I will now proceed to describe the apparatus particularly applicable to the treatment of blood according to my improved process above described.

Figure 1:
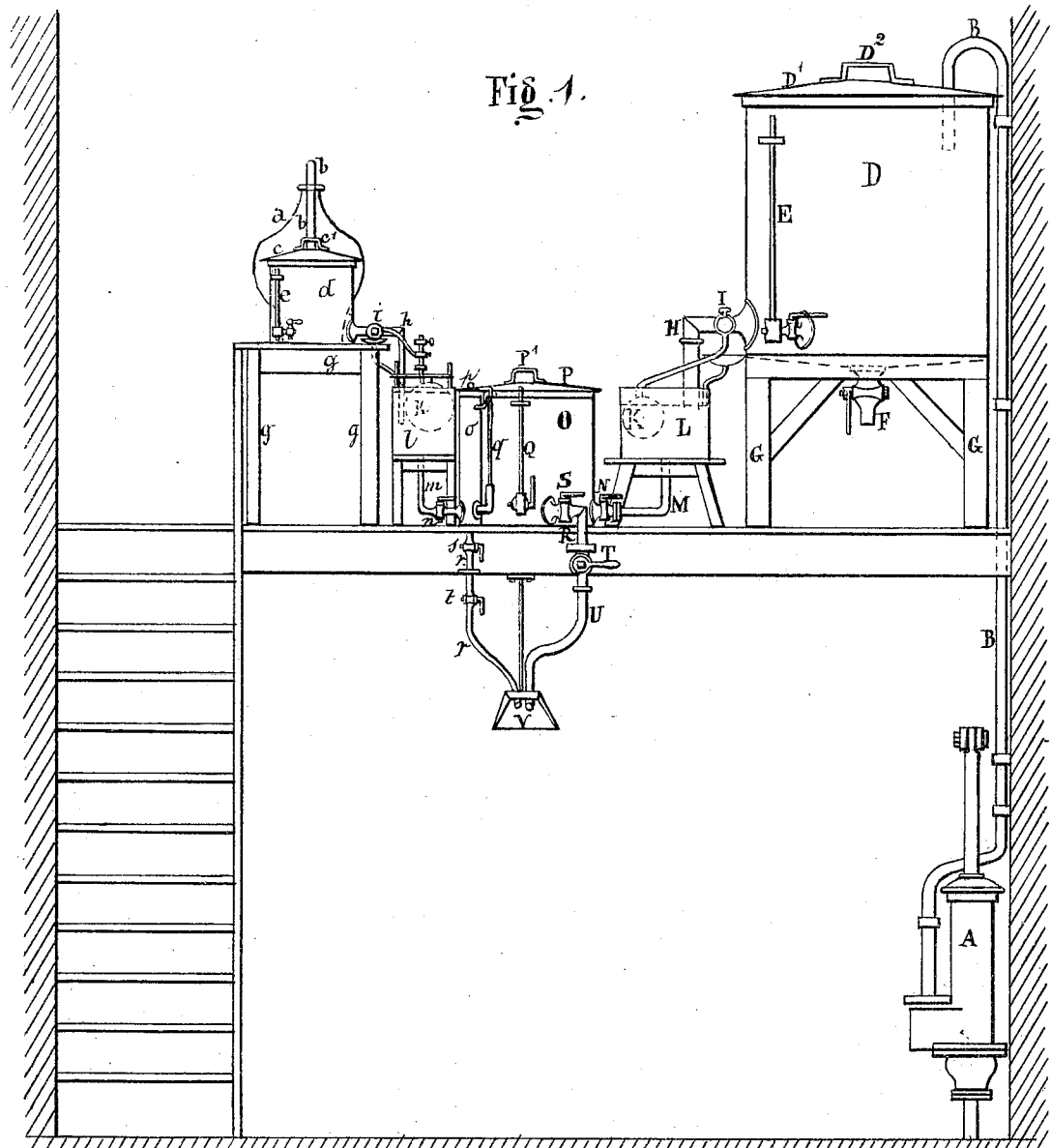
Figure 2:
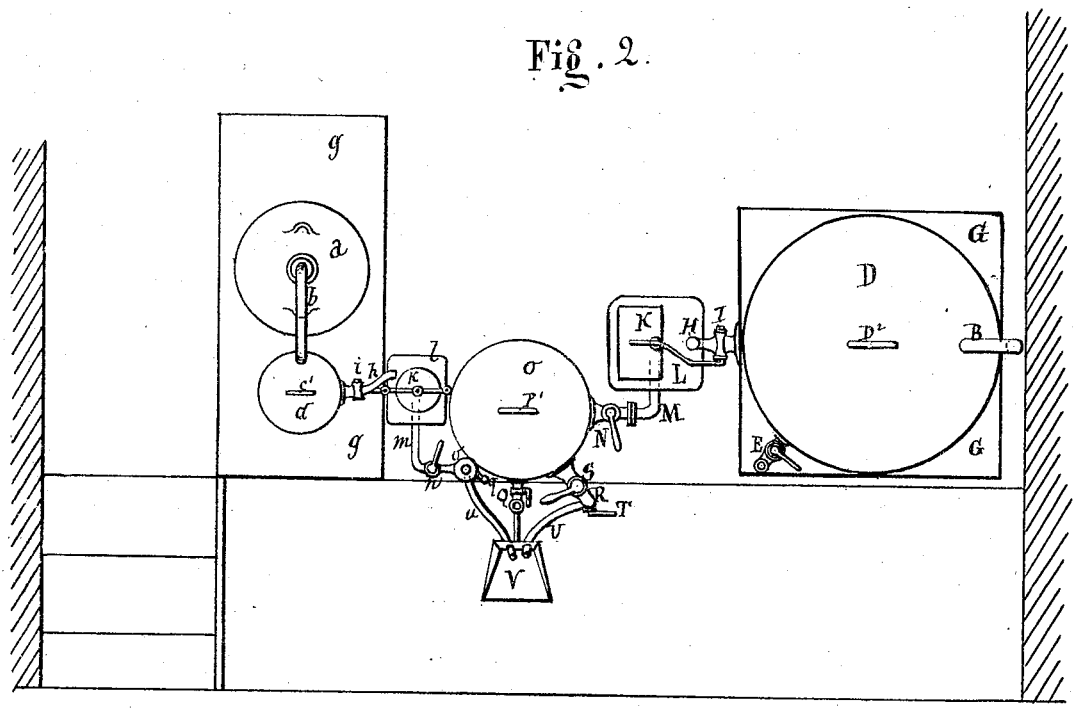

Figure 1 is a vertical elevation, and Fig. 2 a plan, of my improved apparatus.

A is a pump, by means of which the blood is pumped into a sheet-iron tank or reservoir, D, through a feed-pipe, B. The reservoir D is provided with a movable lid, $D^1$, having a handle, $D^2$, and a suitable opening for the passage of the feed-pipe B.

The tank D is further provided with a glass gage, E, by means of which the level of the blood in the tank may at any time be ascertained.

F is a large stop-cock, by means of which the tank is emptied when the same is to be cleaned, and to that effect the bottom of the tank D is constructed so as to incline from all sides toward the center, as indicated by dotted lines, Fig. 1, where the opening leading into the exit-pipe is formed.

G is the frame upon which the tank or reservoir D rests, and is constructed in any convenient manner. H is the delivery-pipe, provided with a regulating-cock, I, and this delivery-pipe H delivers the blood into an intermediate tank, L.

The regulating-cock I is controlled by a cylindrical copper float, K, in the intermediate tank, L, which is connected to such regulating-cock I in such manner that the delivery of the blood from the tank D into the tank L is gradually cut off as the float rises, and entirely so whenever the float K reaches a certain level. (Indicated by dotted lines in the drawings.)

O is the distributing-tank, also constructed of iron, and provided with a movable cover, P, having a handle, P'. The tank O is further provided with a glass gage, by means of which the level of the blood in each tank O is ascertained at all times.

The reservoir O is connected with the tank L by means of a pipe, M, provided with a cock, N, by means of which the flow of blood from the tank L to the tank O is regulated. The tank O is further provided with a delivery-pipe, R, each delivery-pipe R being provided, near the tank O—that is, on its horizontal portion—with a regulating-cock, S, by means of which the flow of blood from each tank O is regulated empirically.

The vertical portion of the delivery-pipe R is further provided with a stop-cock, T, by means of which the flow of blood from the delivery-pipe R may be stopped when desired, in order not to disturb the position of the regulating-cock S, after such flow has once been ascertained empirically by means of such regulating cock S or when it becomes necessary to replenish the tank O after the blood contained therein has been exhausted. U is a lead pipe, one end of which is affixed over the lower end of the delivery-pipe R, the other end of which enters into a drip-board made of lead, upon which the mixing of the blood with the acids is accomplished, as hereinafter more fully explained.

*a* is a carboy or other suitable vessel for the reception of the sulphuric acid, which I, by preference, use of 66° Baumé. *b* is a glass siphon, by means of which the carboy *a* and reservoir *d* are connected together.

The reservoir *d* is, by preference, made of lead, and is provided with a movable cover, *c*, also of lead, such cover having a handle, *c'*, affixed thereto, and a suitable opening formed therein for the passage of the siphon *b*. The reservoir *d* is further provided with a glass gage, *e*, by means of which the quantity of sulphuric acid contained in such reservoir can be ascertained at any time. *g* is a table or other suitable device for the support of the carboy *a* and reservoir *d*. *h* is a delivery-pipe, through which the sulphuric acid flows into the receiving-tank *l*. This delivery-pipe *h* is provided with a suitable cock, *i*, for regulating the delivery of the sulphuric acid from the reservoir *d* to the receiving-tank *l*, and this cock *i* is actuated and governed by the spherical glass float *k* in the receiving-tank *l*, such glass float *k* completely cutting off the flow when the sulphuric acid is at a certain level (indicated by dotted lines in the drawings) in the secondary tank *l*.

The receiving-tank *l* is connected to a distributing-cylinder, *o*, made also of lead, by means of a lead pipe, *m*, such lead pipe *m* being provided with a regulating-cock, *n*, made of stoneware or other suitable material, by means of which cock *n* the flow of sulphuric acid from the receiving-tank *l* to the distributing-cylinder *o* is regulated at will, or cut off entirely when desired.

The distributing-tank *o* is provided with a suitable cover, *p*, and a glass gage, *q*, by means of which gage *q* the quantity of sulphuric acid contained in such distributing-tank *o* may be ascertained at any time.

*r* is a delivery-pipe, passing from the distributing-tank *o* through and onto the drip-board V, and by means of which the acid is delivered in regulated quantities with a continuous flow onto such drip or mixing board or plate V. The delivery-pipe *r* is also provided, like the delivery-pipe U, with a regulating-cock, *s*, of stoneware or similar material, by means of which the quantity of sulphuric acid to be delivered is empirically determined, and when once determined remains in the given position; and in order that this determined position may not be disturbed, the delivery-pipe *r* is further provided with a cock, *t*, also of stoneware or similar material, by means of which stop-cock *t* the flow of sulphuric acid is cut off when it is desired to replenish the reservoir by substituting a filled carboy in place of the empty one.

The operation of my apparatus is as follows: The blood is dumped, as it arrives from the slaughter-houses, into a suitable reservoir provided with a sheet-iron, wire-cloth, or other suitable strainer or filter, by means of which all foreign matter is separated from the blood. From this reservoir the blood is pumped by a pump, A, into a tank or reservoir, D, and therein such blood is first treated as follows: To two hundred pounds of blood I add about two pounds of sulphite of soda, or an alkaline bisulphite, or a sulphite having an alkaline earth base, or chlorite of lime, or any of the hypochlorites, in such manner that by the addition of a mineral acid, as hereinafter explained, one of the constituent elements of the above-named chemicals is liberated, such as sulphurous acid or chlorine, and by the liberation of such elements producing a reaction in all the molecules of the mass, thereby obtaining the following results: First, complete coagulation of the solid particles contained in the blood; secondly, the imputrescibility from exposure to atmospheric or other influences of the coagulated matter obtained. From the reservoir D the blood, after having been thoroughly mixed with either of the above chemicals, in or about in the proportions named, is allowed to flow into a second or receiving tank, L, through a delivery-pipe, H, the flow of blood to such receiving-tank L being controlled and regulated by means of a float, K, connected to a regulating-cock, I, as above described. From this receiving-tank L the blood is transferred into a third or distributing tank, O, through pipe M. Such pipe M is provided with a regulating-cock, N, for regulating the delivery of the blood from tank L to tank O. The reservoir D, as well as the distributing-tank O, are provided with glass gages, so as to enable the attendant to ascertain the amount of blood contained in each tank. The distributing-tank O is provided with a delivery-pipe, R, such pipe R having a regulating-cock, S, on its horizontal portion, by means of which the delivery is regulated by experiment, in order to ascertain the quantities of blood to be delivered in conjunction with the quantities of acid to be mixed with such blood upon its reaching the drip or mixing board or plate, as hereinafter more fully explained.

When the quantity of blood to be delivered is once ascertained the regulating-cock S remains in the given position, and in order that that position may not be changed when it becomes necessary from any cause to stop the flow of blood, the delivery-pipe R is further provided with a stop-cock, T, by means of which the flow of blood may be cut off at any time.

The delivery-pipe R is provided, at its lower end, with a lead pipe, U, such lead pipe U traversing through and onto the drip or mixing board or plate V.

The acid to be mixed with the blood, in order to produce the reaction between the particles, as well as the coagulation and the imputrescibility of the coagulated mass, is introduced into the reservoir $d$ by means of a glass siphon, $b$, direct from the carboy $a$, containing sulphuric or chloridic acid, or such compounds as sulphite of aluminum or sulphite of iron.

The reservoir $d$ is provided with a delivery-pipe, $h$, through which the acid flows into the receiving-tank $l$. Such delivery-pipe $h$ is provided with a regulating-cock, $i$, controlled and regulated by a float, $k$, in the receiving-tank $l$, by means of which the quantity of acid to be delivered is controlled from the receiving-tank $l$. The acid is conducted, by pipe $m$, into the distributing-tank $o$, and the pipe $m$ is provided with a regulating-cock, $n$, so as to regulate the flow of the acid from the tank $l$ to the tank $o$. The tanks $d$ and $o$ are also provided with gages, by means of which the quantity of acid contained therein is ascertained at all times.

From the distributing-tank O the acid flows through a delivery-pipe, $r$, provided, like pipe R, with a regulating-cock, $s$, by means of which the quantity of acid to be delivered is ascertained empirically, and, when once ascertained, the regulating cock $s$ remains in the given position, and when it is desired to cut off the supply of acid the stop-cock $t$ is used as in pipe R.

The acid, like the blood, is delivered by pipes $r$ R U, simultaneously and continuously, as well as in regulated quantities, upon the drip board or plate V, when the two mix together, and the blood, previously treated as specified, coming in contact with the acid, the liberation of one of the constituent elements of the sulphite or alkaline bisulphite, &c., coagulates such blood, and, at the same time, renders it imputrescible.

The coagulated blood is received as it falls from the drip-board by a strainer of any suitable material, and the coagulated mass may then be dried and pulverized, or else pressed into cakes, or may be kept in any other convenient manner for use and shipment.

The tanks D O $d$ $o$ are provided with suitable covers, as shown, and by varying the sizes of the distributing-tanks $o$ any quantity of acid may be delivered.

One of the principal advantages of my apparatus consists in its combinations by means of which both the blood and acid are delivered in a continuous stream and in regulated quantities, thereby causing a regular unchanging result.

By preference, I regulate the flow in such manner as to deliver from two to six pounds, or thereabout, of sulphuric acid, of 66° Baumé, to every two hundred pounds of blood previously treated in tank or reservoir D, as explained.

Having thus described my invention, I would have it understood that I do not confine myself to the exact quantities specified of the chemicals employed, as they may be varied according to circumstances; nor do I confine myself to the exclusive use of the above-described apparatus in the treatment and conversion of blood, as other chemical fertilizers may be treated thereby; but

What I do claim, and desire to secure by Letters Patent, is—

1. The process of converting blood into an imputrescible fertilizer by treating such blood with an alkaline sulphite, or its equivalent, and subjecting the blood so treated to the action of sulphuric acid, or its equivalent, by mixing such blood with the acid in constant and regulated quantities, substantially as specified.

2. The tank D, in combination with the pipe H, tank L, float K, regulating-cock I, pipe M, regulating-cock N, tank O, pipes R U, regulating-cock S, stop-cock T, and drip or mixing board or plate V, substantially as and for the purpose specified.

3. The receptacle $a$, reservoir $d$, connected together by the siphon $b$, in combination with pipe $h$, reservoir or tank $l$, float $k$, regulating-cock $i$, pipe $m$, regulating-cock $n$, distributing-tank $o$, pipe $r$, regulating-cock $s$, stop-cock $t$, and a drip or mixing board or plate, V, substantially as and for the purpose set forth.

4. The tanks D L O, connected together as described, and the pipes R U, in combination with the tanks $d$ $l$ $o$, connected together as described, pipe $r$, and a drip or mixing board or plate, V, when arranged, constructed, and operating in the manner and for the purposes set forth.

HENRI ANTOINE PROSPER LISSAGARAY.

Witnesses:
CH. F. THIRION,
FRIDIRIC WEIL.